3,069,371
OIL-IN-WATER SURFACE COATING EMULSIONS
Robert J. Carney, Saxonville, and Frank J. Hahn, Springfield, Mass., assignors to Monsanto Chemical Company, St. Louis, Mo., a corporation of Delaware
No Drawing. Filed Mar. 9, 1960, Ser. No. 13,697
14 Claims. (Cl. 260—23)

This invention relates to novel surface coating compositions. More particularly, it relates to novel oil-in-water emulsions of unsaturated fatty acid esters of copolymers of ethylenically unsaturated alcohols and styrene monomers.

Surface coating compositions comprised of hydrocarbon solutions of essentially completely esterified fatty acid esters of styrene-allyl alcohol copolymers have been prepared by E. C. Shokal and P. E. Devlin; U.S. 2,588,890 and U.S. 2,630,430. However, the use of hydrocarbon solvents in large proportions precludes the application of these esterified copolymers to end uses where aqueous dispersions are required or preferred. Moreover, the esterified copolymers themselves are relatively soft and have insufficient solvent resistance for many applications, especially where rapid baking is necessary or desirable. Thus, these disadvantages combine to preclude, or limit, the application of fatty acid esters of styrene-allyl alcohol copolymers in such uses as aqueous automotive dipping primers, aqueous industrial finishes, aqueous automobile and industrial baking finishes, etc.

It is an object of this invention to provide novel surface coating compositions.

Another object is the provision of novel aqueous surface coating emulsions containing unsaturated fatty acid esters of copolymers of ethylenically unsaturated alcohols and styrene monomers.

Another object is the provision of novel air drying and baking finishes prepared from novel aqueous surface coating emulsions containing unsaturated fatty acid esters of copolymers of ethylenically unsaturated alcohols and styrene monomers.

A further object is the provision of highly adhesive, flexible and hydrolysis-resistant surface coatings of improved hardness.

These and other objects are attained by combining (1) an unsaturated fatty acid ester of a copolymer of an ethylenically unsaturated alcohol and a styrene monomer, from 50–75% of the hydroxyl groups of said copolymer being so esterified and said esterified copolymer being associated with sufficient free fatty acid to possess an acid number of at least 2, but not more than 12, with (2) water and (3) sufficient ammonia or soap-forming amine to at least completely neutralize said free fatty acid and yield a stable oil-in-water emulsion containing from 10–60% of esterified copolymer by weight.

The following examples are presented in illustration of the invention and are not intended as limitations thereon.

*Example I*

(a) A 1-liter flask is equipped with a stirrer, a thermometer, a water condenser and a trap filled with xylene. Three hundred grams of a copolymer comprised of about 70% by weight of styrene and, correspondingly, a theoretical 30% by weight of allyl alcohol, but having an actual hydroxyl group content of about 6.4% by weight, are charged thereto together with 240 grams of soya fatty acids and 30 grams of xylene. The mixture is gradually heated to reflux (circa 160° C.) and then to about 225° C. over a period of 1 hour and is maintained thereat for an additional hour. About 30 ml. of mixed water and xylene are removed from the trap. The batch temperature is then increased, over a 45-minute period, to about 300° C. and is maintained thereat for an additional 2 hours. A fused esterified resin wherein approximately 75% of the hydroxyl groups have been esterified is obtained in conjunction with sufficient free soya fatty acids to provide an acid number of about 3.

(b) Five hundred grams of the product of (a) are charged to a one-half gallon stainless steel kettle equipped with a close fitting anchor stirrer. The batch is heated to about 50° C. and agitation is started. After about 1 minute, 50 ml. of an aqueous ammonium hydroxide solution containing 0.25% ammonia by weight are charged and the mixture is stirred until a smooth viscous paste is obtained (circa 25 minutes). Then an additional 285 ml. of said 0.25% aqueous ammonium hydroxide solution are titrated into the stirred viscous mass over a period of about 2 hours, amid stirring, until an oil-in-water emulsion is obtained. The batch temperature is maintained at about 50° C. throughout. The product is a stable oil-in-water emulsion containing about 45% solids by weight.

(c) About 0.06 gram of a water-dispersible cobalt naphthenate containing about 6% $Co^{++}$ by weight is thoroughly blended into a 30-gram portion of the oil-in-water emulsion prepared in (b). A portion of this blended emulsion is then poured onto a clean steel plate and drawn to a uniform wet film thickness of about 0.005 inch with a doctor blade. The plate and film are oven-baked at 150° C. for about 1 hour. Upon cooling, a transparent, hard, flexible and impact resistant film is obtained. The film is resistant to water, 5% caustic solution, methanol and detergents.

*Example II*

Example I is repeated substituting an equal weight of linseed oil fatty acids for the soya fatty acids employed therein. The fused ester obtained is substantially free of residual hydroxyl groups and has an acid number of about 3. A transparent, hard, flexible and impact resistant film is prepared therefrom. The film is resistant to water, 5% caustic solution, methanol and detergents.

*Example III*

Example I is repeated substituting an equal weight of tall oil fatty acids for the soya fatty acids employed therein. The fused ester obtained is substantially free of residual hydroxyl groups and has an acid number of about 2. A transparent, hard, flexible and impact resistant film is prepared therefrom. The film is resistant to water, 5% caustic solution, methanol and detergents.

*Example IV*

(a) A 1-liter flask equipped as in Example I(a). Three hundred and forty grams of a copolymer comprised of about 70% by weight of styrene and, correspondingly, a theoretical 30% by weight of allyl alcohol, but having an actual hydroxyl group content of about 6.4% by weight, are charged thereto together with 200 grams of soya fatty acids and 30 grams of xylene. The mixture is gradually heated to reflux (circa 160° C.) and then to 225° C. over a period of about 1 hour. The temperature is maintained at about 225±5° C. until about 12 ml. of water are collected in the trap. A fused esterified resin wherein approximately 60% of the hydroxyl groups have been esterified is obtained. The product is adjusted to an acid number of about 6 with linseed oil fatty acids.

(b) Five hundred grams of the product of (a) are charged to a one-half gallon stainless steel kettle equipped with a close-fitting anchor stirrer. The batch is heated to about 40° C. and agitation is started. After about 1 minute, 100 ml. of an aqueous ammonium hydroxide solution containing about 3% ammonia by weight are charged and the mixture is stirred until a smooth viscous paste is obtained (circa 30 minutes). Then 400 ml. of a second aqueous ammonium hydroxide solution containing about 0.75% ammonia by weight are titrated into the stirred viscous mass over a period of about 2 hours, amid stirring, until an oil-in-water emulsion is obtained. The batch temperature is maintained at about 40° C. throughout. The resulting oil-in-water emulsion is adjusted to about 40% solids by weight with water and stirred until homogeneous.

(c) About 0.06 gram of a water-dispersible cobalt naphthenate containing about 6% $Co^{++}$ by weight is thoroughly blended into a 30 gram portion of the oil-in-water emulsion prepared in (b). A portion of this blended emulsion is then poured onto a clean steel plate and drawn to a uniform wet film thickness of about 0.005 inch with a doctor blade. The film is dried in a hot air oven at about 150° C. for 30 minutes. A hard, transparent, flexible and impact resistant film is obtained. The film is resistant to water, 5% caustic solution, methanol and detergents.

*Example V*

Example IV is repeated eliminating the xylene from the charge and from the trap in step (a). A transparent, hard, flexible and impact resistant film is obtained. The film is resistant to water, 5% caustic solution, methanol and detergents.

*Example VI*

A 5-liter flask is equipped as in Example I(a). Fourteen hundred grams of a copolymer comprised of about 80% by weight of styrene and, correspondingly, a theoretical 20% by weight of allyl alcohol, but having an actual hydroxyl group content of about 4.3% by weight, are charged thereto together with 730 grams of soya fatty acids and 140 grams of xylene. The mixture is gradually heated to reflux (circa 160° C.) and then to about 225° C. over a period of about 1 hour. The temperature is maintained at 225±5° C. until about 63 ml. of water are collected in the trap. A fused esterified resin wherein substantially 75% of the hydroxyl groups have been esterified is obtained. The product is adjusted to an acid number of about 12 with further soya fatty acids. An oil-in-water emulsion is prepared and an air-dried film cast therefrom; according to the procedure set forth in Example IV, steps (b) and (c) respectively. A transparent, hard, flexible and impact resistant film is obtained. The film is resistant to water, 5% caustic solution, methanol and detergents.

*Example VII*

(a) A 5-liter flask is equipped as in Example I(a). Fourteen hundred grams of a copolymer comprised of about 60% by weight of styrene and, correspondingly, a theoretical 40% by weight of allyl alcohol, but having an actual hydroxyl group content of about 7.5% by weight, are charged thereto together with 1280 grams of tall oil fatty acids and 140 grams of xylene. The mixture is gradually heated to reflux (circa 160° C.) and then to about 225° C. over a period of about 1 hour and is maintained thereat for an additional 2 hours. A fused esterified resin wherein approximately 70% of the hydroxyl groups are esterified is obtained in conjunction with sufficient tall oil fatty acids to provide an acid number of about 3.

(b) Five hundred grams of the product of (a) are charged to a one-half gallon stainless steel kettle equipped with a close-fitting anchor stirrer. The batch is heated to about 40° C. and agitation is started. After about 1 minute, 410 ml. of an aqueous ammonium hydroxide solution containing about 0.75% ammonia by weight are titrated into the stirred viscous mass over a period of about 2 hours, during which time inversion from a water-in-oil emulsion to and oil-in-water emulsion occurs. The batch temperature is maintained at about 40° C. throughout. The product is stable oil-in-water emulsion containing about 55% solids by weight.

(c) A baked film is prepared from the oil-in-water emulsion prepared in (b) employing the procedure set forth in Example I(c). A transparent, hard, flexible and impact resistant film is obtained. The film is resistant to water, 5% caustic solution, methanol and detergents.

The resinous components of the surface coating compositions of this invention are copolymers of from 60–85% by weight of a styrene monomer and, correspondingly, from 40–15% by weight of an ethylenically unsaturated alcohol wherein from 50–75% of the hydroxyl groups thereof are esterified with an unsaturated fatty acid. The actual hydroxyl group content of the aforesaid copolymers (before esterification) will not always conform to the theoretical content calculated from the relative proportions of styrene monomer and ethylenically unsaturated alcohol, due to possible destruction of hydroxyl groups during copolymerization. In general, however, copolymers containing from about 4.0 to 7.5% hydroxyl groups by weight are within the scope of this invention. The styrene monomer moiety of said copolymer may be styrene or a ring-substituted styrene in which the substituents are 1–4 carbon atom alkyl groups or chlorine atoms. Examples of such ring-substituted styrenes include the ortho-, meta- and para-, methyl, ethyl, butyl, etc. monoalkyl styrenes; 2,3- 2,4-dimethyl and diethyl styrenes; mono-, di- and tri-chlorostyrenes; alkylchlorostyrenes such as 2-methyl-4-chlorostyrene, etc. Mixtures of two or more of such styrene monomer moieties may be present. The ethylenically unsaturated alcohol moiety may be allyl alcohol, methallyl alcohol, or a mixture thereof. For the purposes of brevity and simplicity of discussion, the entire class of copolymers set forth in this paragraph shall hereinafter be referred to simply as styrene-allyl alcohol copolymers.

The styrene-allyl alcohol copolymers may be prepared in several ways. However, it is most desirable to copolymerize the styrene and allyl alcohol components in a substantially oxygen-free system, thus minimizing the oxidative loss of hydroxyl groups (see U.S. 2,894,938). It is especially preferred to employ styrene-allyl alcohol copolymers containing a relatively uniform distribution of hydroxyl groups. It has been found that such copolymers provide surface coating films possessed of uniform properties; i.e., films free of surface areas deficient in one or more of the important properties such as, e.g., solvent resistance, adhesion, etc. These latter copolymers may be prepared as taught in copending application, S.N. 771,177, filed November 3, 1958.

The unsaturated fatty acids with which the aforementioned styrene-allyl alcohol copolymers are esterified are those containing from 10–24 carbon atoms. Examples of suitable unsaturated fatty acids include $\Delta^{9,10}$-decylenic acid, $\Delta^{9,10}$-dodecylenic acid, palmitoleic acid, oleic acid, ricinoleic acid, petroselinic acid, vaccenic acid, linoleic acid, linolenic acid, eleostearic acid, licanic acid, parinaric acid, tariric acid, gadoleic acid, arachidonic acid, cetoleic acid, erucic acid, selacholeic acid, etc. Mixtures of such fatty acids may also be employed. Especially preferred are the mixtures of such unsaturated fatty acids as obtained by the hydrolysis of drying and semi-drying oils such as acorn oil, beechnut oil, Brazil nut oil, chaulmoogra oil, corn oil, cottonseed oil, croton oil, hemp seed oil, linseed oil, oiticica oil, perilla oil, poppy seed oil, sesame oil, soybean oil, safflower oil, sunflower oil, tall oil, tung oil, walnut oil, dehydrated castor oil, etc.

The esterified resins are prepared by co-reacting an unsaturated fatty acid and a styrene-allyl alcohol copolymer until from 50–75% of the hydroxyl groups of the copolymer are esterified. This may be accomplished by employing a proportion of unsaturated fatty acid substantially stoichiometrically equivalent to the proportion of hydroxyl groups desired to be esterified. The necessary proportions may be readily determined by a chemist from quantitative analysis data expressed in milliequivalents of carboxyl and hydroxyl groups per unit weight of unsaturated fatty acid and styrene-allyl alcohol copolymer, respectively.

The subsequent emulsification of these esterified copolymers requires the presence of a free fatty acid, either saturated or unsaturated, of the species above set forth, in a proportion such that a mixture of the esterified copolymer and the free fatty acid would have an acid number of from about 2-12. If desired, this requirement may be satisfied by adding a further quantity of an unsaturated, or saturated, fatty acid to the esterified copolymers prepared supra prior to emulsification. Alternatively, an equivalent amount of an amino salt of a fatty acid may be added during the emulsification. However, in another embodiment, esterified copolymers having predetermined acid numbers may be prepared directly by employing a carefully calculated stoichiometric excess of the unsaturated fatty acid in the esterification reaction and terminating the reaction after the desired proportion of hydroxyl groups of the styrene-allyl alcohol copolymer have been esterified. The foregoing alternatives may advantageously be combined to obtain desired results. Thus, the esterified copolymer may be acidified with saturated fatty acids alone, with unsaturated fatty acids alone, with mixtures of both or the copolymer may be esterified directly to one predetermined acid number and then adjusted to another, within the above range, with a dissimilar fatty acid.

Esterified copolymers having an acid number above about 12 are undesirable since, upon emulsification, they cause excessive foaming and thickening of the emulsion. Also, films cast therefrom have decreased resistance to water. It has been found that those esterified copolymers having acid numbers of from about 4-6 provide an optimum balance between the critical considerations of stability of emulsions preparable therefrom and the quality of the films cast from such emulsions.

As previously mentioned, either saturated or unsaturated fatty acids may be employed in co-mixture with the esterified copolymers to produce the desired acid number. Those fatty acids containing from 10-24 carbon atoms are contemplated within the scope of this invention. Examples of suitable unsaturated fatty acids have been heretofore set forth. Examples of suitable saturated fatty acids include capric acid, lauric acid, myristic acid, palmitic acid, stearic acid, arachidic acid, behenic acid, lignoceric acid, etc. Mixtures of such fatty acids may also be employed. Especially preferred among the saturated fatty acids are the mixtures thereof as obtained by the hydrolysis of non-drying oils such as coconut oil, babassu oil, palm oil, olive oil, castor oil, peanut oil, rape oil, etc. When an unsaturated fatty acid is so employed it need not be the same as the one present in the esterified copolymer.

To return to the esterification reaction in detail, said reaction may be effected to the desired degree of esterification at temperatures of from 160° C. to about 225° C. without significant destruction of hydroxyl groups. However, prolonged heating at higher temperatures is apt to result in a loss of hydroxyl groups from the copolymer. Thus, it is preferred to avoid the use of reaction temperatures above about 225° C. although temperatures of up to about 325° C. may be employed if desired. The reaction may be terminated short of completion merely by ceasing to heat, by quenching, or by other conventional techniques. The esterification may be conducted in the presence of an inert hydrocarbon solvent such as xylene, mineral spirits, etc. However, the use of solvent is optional since the esterification proceeds satisfactorily in the absence of solvent. If a limited proportion of solvent is employed, e.g., up to about 10% by weight, it is not necessary to remove same before emulsification. In any event, excess solvent should be removed by, e.g., evaporation prior to emulsification.

The surface coating compositions of this invention are stable oil-in-water emulsions comprised essentially of the esterified copolymers heretofore discussed, water-soluble amino salts of fatty acids and water, all in critical proportions as hereinafter set forth. The water-soluble amino salts of fatty acids are formed during the emulsification step by the neutralization of the free fatty acids associated with the esterified copolymer with at least a stoichiometrically equivalent proportion of ammonia or of a soap-forming amine.

When a soap-forming amine is employed, it should satisfy two requirements. First, it should form water-soluble salts in conjunction with the fatty acids present. Secondly, it should be capable of being volatilized at the temperatures employed in the cure of films cast from the final surface coating compositions. Thus, ammonia, methylamine or ethylamine should be used when manufacturing low temperature baking compositions. For higher temperature baking compositions, amines boiling at temperatures of up to about 450° C. may be employed. Examples of suitable soap-forming amines include mono-, di- and tri-alkyl amines such as ethylamine, diethylamine, triethylamine, n-propylamine, n-butylamine, tri-n-butylamine, n-hexylamine, etc.; mono-, di- and tri-alkanol amines such as ethanolamine, diethanolamine, triethanolamine, 2-methyl-2-amino propanol, etc.; morpholine; etc.

In an alternative method, equivalent oil-in-water emulsions may be prepared employing the corresponding pre-prepared amino salts of fatty acids. Thus, non-acidified esterified copolymers, or those associated with less than the desired proportion of fatty acids, may be emulsified directly. Proportions consistent with the principles herein set forth are used.

Returning to the emulsification procedure, the esterified copolymer is first adjusted, if necessary, to the desired acid number with fatty acid and, subsequently, the ammonia, or amine, and water are slowly charged thereto amid continuous stirring. It is generally most convenient to charge these latter components as an aqueous solution of the ammonia or soap-forming amine, although the ammonia, or amine, may be charged separately, followed by titration of water. The rate at which this aqueous phase is charged should be controlled such that the viscosity within the stirred mixture provides sufficient mechanical force to form, initially, a smooth water-in-oil emulsion. Such techniques are well-known to those skilled in the art of emulsification. The aqueous phase is charged at a controlled rate to maintain shear until inversion from the water-in-oil emulsion to an oil-in-water emulsion is complete. Any remaining water may then be added rapidly, stirring the final emulsion until homogeneous. The entire operation may require anywhere from 1-5 hours. A batch temperature of from 10-100° C. is maintained throughout.

In an alternative, and preferred, embodiment, from 40-60% of the total quantity of ammonia, or amine, to be employed may be charged initially in the form of a dilute aqueous solution and the batch stirred into a homogeneous, viscous water-in-oil emulsion. Then the remaining ammonia, or soap-forming amine, and water may be charged at a slow rate consistent with the principle set forth in the preceding paragraph until after inversion has occurred.

Sufficient water is added during the emulsification to produce oil-in-water emulsions containing from about 10-60% of esterified copolymer solids by weight. Those emulsions containing from about 40-60% of esterified copolymer by weight are preferred for practical reasons; e.g., the economic undesirability of shipping larger proportions of water than is necessary, etc. If more dilute emulsions are desired for particular applications, further quantities of water may be blended in at the time of use without danger of demulsification or flocculation.

The oil-in-water emulsions of this invention do not flocculate, even after storage under normal conditions for periods in excess of 6 months. Such stability is obtained even though conventional emulsifiers, beyond those formed during emulsification, have not been used. Thus, these stable emulsions contain a fugitive emulsifier which is volatilized upon curing of films cast therefrom, yielding more uniform and resistant films. In fact, it has been found that the presence of an additional emulsifier actually leads to flocculation. However, these latter emulsions are stable to a degree, since the flocculation is reversible, the original oil-in-water emulsion being restored by shaking or mixing. Therefore, while not preferred, a minor proportion, i.e., from 0.5–6% by weight, based upon the esterified copolymer, of a conventional anionic or non-ionic emulsifying agent may be employed if desired. Such emulsifiers are well-known to those skilled in the art. The most recent listing of such emulsifiers is found in a series of papers entitled "Synthetic Detergents and Emulsifiers—Up to Date, III, 1955," written by John W. McCutcheon and published in the July, August, September and October 1955 issues of "Soap and Chemical Specialties." Bound reprints of these papers are available from John W. McCutcheon, Inc., 475 Fifth Avenue, New York 17, New York.

The oil-in-water emulsions of this invention are useful alone or in co-mixture with other resinous emulsions or lattices of, e.g., vinyl or vinylidene polymers such as polyvinyl acetate, vinyl acetate-maleic anhydride copolymers, styrene-butadiene copolymers, styrene-acrylate ester copolymers, acrylate or methacrylate homopolymers or copolymers, etc., aminoplast resins such as melamine-, urea-, N-substituted amino-triazine-, etc. formaldehyde condensates, etc. Small quantities of a conventional drier such as cobalt naphthenate, etc., may be employed, if desired, to improve the drying characteristics of films cast therefrom. They are useful alone, or modified as above, in oven-baked industrial primers, topcoats, varnishes, inks, wood sealers, etc., employed in the finishing of such commercial products as automobiles, appliances, furniture, architectural structures, etc. They may be modified before use by incorporating therein conventional additives such as pigments, fillers, stabilizers, plasticizers, etc. Such additives may be incorporated into the esterified copolymer either before or after emulsification.

Films cast from the oil-in-water emulsions of this invention exhibit superior adhesion to most surfaces, including metals, glass, wood, masonry, plaster, textiles, other resins, asphaltous matrixes, etc. They possess an unusually attractive balance between the properties of flexibility and hardness, as well as being resistant to impact and to common household and industrial solvents, e.g., water, ammonium hydroxide, dilute caustic solutions, vinegar, alcohol, soap, detergents, etc.

It is obvious that many variations may be made in the products and processes set forth above without departing from the spirit and scope of this invention.

What is claimed is:

1. A stable non-flocculating oil-in-water emulsion comprising (a) 100 parts of an unsaturated fatty acid ester of a copolymer of an ethylenically unsaturated alcohol and a styrene monomer, (b) an emulsifier consisting of an amino salt of a fatty acid present in a molar proportion equivalent to the molar proportion of the corresponding free fatty acid which would theoretically be required to provide an acid number of from about 2–12 in co-mixture with said esterified copolymer and (c) from 65–900 parts by weight of water; said esterified copolymer being a copolymer of an ethylenically unsaturated alcohol selected from the group consisting of allyl alcohol, methallyl alcohol and mixtures thereof and a styrene monomer selected from the group consisting of styrene, ring-substituted mono- and di-, alkyl-, chloro- and chloroalkyl-styrenes and mixtures thereof having an initial hydroxyl group content, before esterification, of from about 4–7.5% by weight, from 50–75% of said hydroxyl groups being esterified with an unsaturated fatty acid selected from the group consisting of unsaturated fatty acids containing from 10–24 carbon atoms and mixtures thereof as obtained by the hydrolysis of drying and semi-drying oils; said amino salt of a fatty acid being a salt of an amino compound selected from the group consisting of ammonia and fugitive soap-forming amines and a fatty acid selected from the group consisting of saturated and unsaturated fatty acids containing from 10–24 carbon atoms and mixtures thereof as obtained by the hydrolysis of drying, semi-drying and non-drying oils; said fugitive soap-forming amines being defined as those amines which form water-soluble soaps in combination with said fatty acids and which have atmospheric boiling points of up to 450° C.

2. A stable non-flocculating oil-in-water emulsion as in claim 1 wherein the esterified copolymer is a soya fatty acid ester of a copolymer of styrene and allyl alcohol having a hydroxyl group content of about 6.4% by weight before esterification.

3. A stable non-flocculating oil-in-water emulsion as in claim 2 wherein the amino salt of a fatty acid is an ammonium salt of soya fatty acids.

4. A stable non-flocculating oil-in-water emulsion as in claim 3 wherein the ammonium salt of soya fatty acids is present in a molar proportion equivalent to the molar proportion of soya fatty acids which would theoretically be required to provide an acid number of from about 4–6 in co-mixture with the esterified copolymer.

5. A process for preparing a stable non-flocculating oil-in-water emulsion which comprises (a) esterifying a copolymer of an ethylenically unsaturated alcohol and styrene monomer having a hydroxyl group content of from about 4–7.5% by weight with an unsaturated fatty acid at a temperature of from 160–225° C. until from 50–75% of said hydroxyl groups are esterified, employing an excess of said unsaturated fatty acid above the stoichiometric proportion thereof necessary to effect the desired degree of esterification so as to provide an acid number of from 2–12, (b) slowly charging thereto from 65–900 parts by weight of water per 100 parts by weight of esterified copolymer together with a proportion of an amino compound selected from the group consisting of ammonia and fugitive soap-forming amines at least stoichiometrically equivalent to the proportion of free unsaturated fatty acid associated with said esterified copolymer while (c) continuously stirring the mixture at a batch temperature of from about 10–100° C. until an oil-in-water emulsion is formed; the ethylenically unsaturated alcohol moiety of said copolymer being selected from the group consisting of allyl acohol, methallyl alcohol and mixtures thereof and the styrene monomer moiety of said copolymer being selected from the group consisting of styrene, ring-substituted mono- and di-, alkyl-, chloro- and chloroalkyl-styrenes and mixtures thereof; said unsaturated fatty acid being selected from the group consisting of unsaturated fatty acids containing from 10–24 carbon atoms and mixtures thereof as obtained by the hydrolysis of drying and semi-drying oils; said fugitive soap-forming amines being defined as those amines which form water-soluble soaps in combination with said fatty acids and which have atmospheric boiling points of up to 450° C.

6. A process for preparing a stable non-flocculating oil-in-water emulsion as in claim 5 wherein approximately 40–60% of said amino compound is initially charged in step (b) in the form of an aqueous solution, this mixture being stirred until homogeneous and, subsequently, slowly charging the remaining amino compound and water while continuously stirring until an oil-in-water emulsion is formed.

7. A process for preparing a stable non-flocculating oil-in-water emulsion as in claim 6 wherein the amino compound is ammonia.

8. A process for preparing a stable non-flocculating oil-in-water emulsion as in claim 6 wherein the copolymer is a copolymer of styrene and allyl alcohol containing from about 4–7.5% hydroxyl groups by weight and the unsaturated fatty acid is soya fatty acids.

9. A process for preparing a stable non-flocculating oil-in-water emulsion which comprises (a) esterifying a copolymer of an ethylenically unsaturated alcohol and a styrene monomer having a hydroxyl group content of from about 4–7.5% by weight with an unsaturated fatty acid at a temperature of from 160–225° C. until from 50–75% of said hydroxyl groups are esterified, employing an excess of said unsaturated fatty acid above the stoichiometric proportion thereof necessary to effect the desired degree of esterification so as to provide a predetermined acid number of less than 12, (b) adjusting said mixture to a higher acid number of from 2–12 with a second proportion of a fatty acid selected from the group consisting of saturated and unsaturated fatty acids containing from 10–24 carbon atoms and mixtures thereof as obtained by the hydrolysis of drying, semi-drying and non-drying oils, (c) slowly charging thereto from 65–900 parts by weight of water per 100 parts by weight of esterified copolymer together with an amino compound selected from the group consisting of ammonia and fugitive soap-forming amines in a proportion at least stoichiometrically equivalent to the total proportion of free fatty acid while (d) continuously stirring the mixture at a batch temperature of from about 10–100° C. until an oil-in-water emulsion is formed; the ethylenically unsaturated alcohol moiety of said copolymer being selected from the group consisting of allyl alcohol, methallyl alcohol and mixtures thereof and the styrene monomer moiety of said copolymer being selected from the group consisting of styrene, ring-substituted mono- and di-, alkyl-, chloro- and chloroalkyl-styrenes and mixtures thereof; said unsaturated fatty acid being selected from the group consisting of unsaturated fatty acids containing from 10–24 carbon atoms and mixtures thereof as obtained by the hydrolysis of drying and semi-drying oils; said fugitive soap-forming amines being defined as those amines which form water-soluble soaps in combination with said fatty acids and which have atmospheric boiling points of up to 450° C.

10. A process for preparing a stable non-flocculating oil-in-water emulsion as in claim 9 wherein approximately 40–60% of said amino compound is initially charged in step (b) in the form of an aqueous solution, this mixture being stirred until homogeneous and, subsequently, slowly charging the remaining amino compound and water while continuously stirring until an oil-in-water emulsion is formed.

11. A process for preparing a stable non-flocculating oil-in-water emulsion as in claim 10 wherein the amino compound is ammonia.

12. A process for preparing a stable non-flocculating oil-in-water emulsion which comprises (a) esterifying a copolymer of an ethylenically unsaturated alcohol and a styrene monomer having a hydroxyl group content of from 4–7.5% by weight with an unsaturated fatty acid at a temperature of from 160–225° C. until from 50–75% of said hydroxyl groups are esterified, employing a proportion of unsaturated fatty acid substantially stoichiometrically equivalent to the proportion of hydroxyl groups desired to be esterified, (b) adjusting the esterified copolymer to an acid number of from 2–12 with second proportion of a fatty acid selected from the group consisting of saturated and unsaturated fatty acids containing from 10–24 carbon atoms and mixtures thereof as obtained by the hydrolysis of drying, semi-drying and non-drying oils, (c) slowly charging thereto from 65–900 parts by weight of water per 100 parts by weight of esterified copolymer together with an amino compound selected from the group consisting of ammonia and fugitive soap-forming amines in a proportion at least stoichiometrically equivalent to said free fatty acid while (d) continuously stirring the mixture at a batch temperature of from about 10–100° C. until an oil-in-water emulsion is formed; the ethylenically unsaturated alcohol moiety of said copolymer being selected from the group consisting of allyl alcohol, methallyl alcohol and mixtures thereof and the styrene monomer moiety of said copolymer being selected from the group consisting of styrene, ring-substituted mono- and di-, alkyl-, chloro- and chloroalkyl-styrenes and mixtures thereof; said unsaturated fatty acid being selected from the group consisting of unsaturated fatty acids containing from 10–24 carbon atoms and mixtures thereof as obtained by the hydrolysis of drying and semi-drying oils; said fugitive soap-forming amines being defined as those amines which form water-soluble soaps in combination with said fatty acids and which have atmospheric boiling points of up to 450° C.

13. A process for preparing a stable non-flocculating oil-in-water emulsion as in claim 12 wherein approximately 40–60% of said amino compound is initially charged in step (b) in the form of an aqueous solution, this mixture being stirred until homogeneous and, subsequently, slowly charging the remaining amino compound and water while continuously stirring until an oil-in-water emulsion is formed.

14. A process for preparing a stable non-flocculating oil-in-water emulsion as in claim 13 wherein the amino compound is ammonia.

References Cited in the file of this patent

UNITED STATES PATENTS

| | | |
|---|---|---|
| 2,865,871 | Johnson et al. | Dec. 23, 1958 |
| 2,894,938 | Chapin et al. | July 14, 1959 |
| 2,897,174 | Chapin et al. | July 28, 1959 |